(12) United States Patent
Levola

(10) Patent No.: US 6,381,061 B2
(45) Date of Patent: *Apr. 30, 2002

(54) PIXEL STRUCTURE HAVING DEFORMABLE MATERIAL AND METHOD FOR FORMING A LIGHT VALVE

(75) Inventor: Tapani Levola, Tampere (FI)

(73) Assignee: Nokia Corporation, Espoo (FI)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/443,822

(22) Filed: Nov. 19, 1999

(51) Int. Cl.$^7$ ............................................. G02B 26/00
(52) U.S. Cl. ..................................... 359/291; 359/292
(58) Field of Search ................................ 359/291, 292, 359/293, 294, 295, 296, 297

(56) References Cited

U.S. PATENT DOCUMENTS

| | | | |
|---|---|---|---|
| 3,084,590 A | 4/1963 | Glenn, Jr. ......................... 88/1 |
| 3,385,927 A | 5/1968 | Hamann ..................... 178/7.5 |
| 3,882,271 A | 5/1975 | Glenn ......................... 178/7.3 |
| 4,519,682 A | 5/1985 | Mast .......................... 353/122 |
| 4,641,193 A | 2/1987 | Glenn ......................... 358/233 |
| 5,124,834 A | 6/1992 | Cusano et al. .............. 359/291 |
| 5,521,747 A | 5/1996 | Engle .......................... 359/292 |
| 5,760,755 A | 6/1998 | Engle .......................... 345/85 |
| 6,147,789 A | * 11/2000 | Gelbart ....................... 359/291 |

FOREIGN PATENT DOCUMENTS

| DE | 301222 | 4/1952 |
|---|---|---|
| DE | 197 57 687 | 7/1998 |

OTHER PUBLICATIONS

International Search Report for Application No. PCT/IB00/01608.
W. Brinker et al., "Deformation Behavior of Thin Viscoelastic Layers used in an Active–Matrix–Addressed Spatial Light Modulator", vol. 1018, Electro–Optic and Magneto–Optic Materials, 1988 pp. 79–85.
R. Tepe et al., "Viscoelastic Spatial Light Modulator with Active Matrix Addressing", vol. 28, No. 22, Applied Optics, Nov., 15, 1989, pp. 4826–4834.
Y. Hoshino et al., "Light Modulation by Transverse Electric Field Induced Oil Surface Deformation" Appl. Phys. Lett. 55, Sep. 11, 1989.

* cited by examiner

*Primary Examiner*—Hung Xuan Dang
(74) *Attorney, Agent, or Firm*—Cohen, Pontani, Lieberman & Pavane

(57) ABSTRACT

A light valve capable of operating in an "off" state for reflecting light and in an "on" state for diffracting and reflecting light. The valve includes a semiconductor substrate having a plurality of electrodes formed therein for receiving voltages and for generating an electric field in response to the received voltages. A layer of transparent deformable dielectric material is disposed on the reflective electrodes which deforms in response to the generated electric field. When the valve is in its "on" state, the electric field causes deformities in the dielectric material which diffract incident light reflected off of the valve. In another embodiment, the dielectric material is placed on a transparent substrate having a transparent electrode formed therein, and is disposed in spaced relation from the semiconductor substrate containing the reflective electrodes.

20 Claims, 3 Drawing Sheets

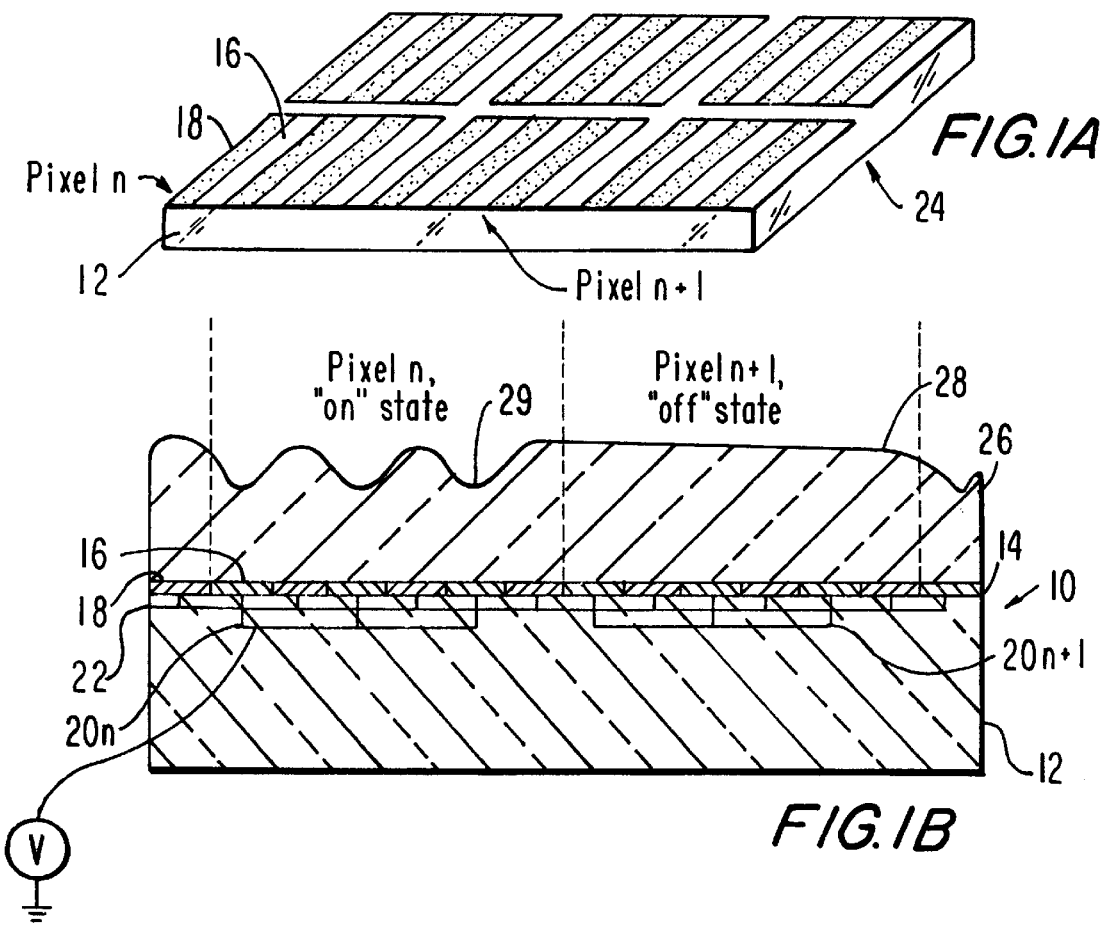
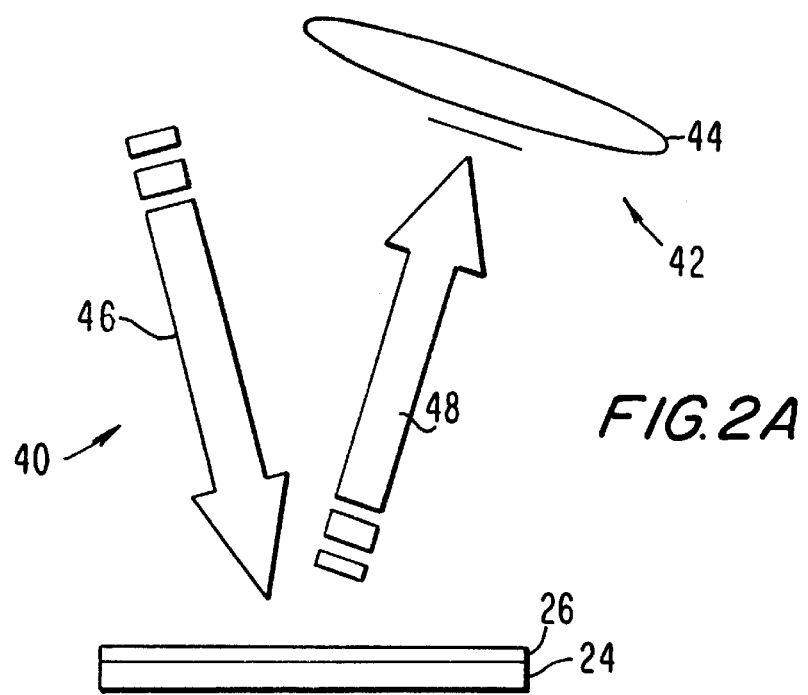

PIXEL STRUCTURE HAVING DEFORMABLE MATERIAL AND METHOD FOR FORMING A LIGHT VALVE

BACKGROUND OF THE INVENTION

1. Field of the Invention

The present invention relates to electronic visual displays for displaying an image. More particularly, the present invention pertains to a light valve structure and fabrication method for use in a projection-type visual display.

2. Description of the Related Art

There are various types of visual electronic displays for displaying or imaging video information. For example, cathode ray tubes have long been employed in televisions and computer monitors wherein electron guns generate electrons which illuminate a target screen in response to an electronic signal. The electronic signal is typically derived from a transmitted video signal received by a receiver connected to the electron guns. The problem with such known systems is that they require relatively high voltages to operate the electron gun and to accelerate the emitted electrons.

Another type of display is a projection system which employs light valves to convert video signals into a viewable image which is then projected on a screen. One type of light valve technology is a grating light valvetrade (GLV) which is a micromechanical phase grating. By providing controlled diffraction of incident light, a GLV device will produce bright or dark pixels in a display system. With pulse width modulation, a GLV device will produce precise gray scale or color variations. Built using microelectromechanical systems (MEMS) technology, a GLV device can be made both small and inexpensively. A variety of display systems can be built using GLV technology, each benefiting from the high contrast ratio, fill ration and brightness. In addition, GLV technology can provide high resolution, low power consumption and digital gray-scale and color reproduction. A drawback of GLV technology is that it is complex to construct a matrix or two-dimensional array of pixels. If a one-dimensional array is constructed, mechanical scanning can be used to simulate a two-dimensional array.

Liquid crystal on silicon (LCOS) has also been used in projection display applications. This technology offers an inexpensive way of projecting an image on a screen. LCOS systems require polarized light for operation which results in a problem of color management in the polarization modulating panels. In LCOS panels, the polarization of incoming light results in a 50% decrease of the available light. Although polarization recovery systems can be used to improve the efficiency of light usage, such systems will only increases the efficiency to approximately 80%.

Still other types of light valves or light modulators comprise a deformable layer of material (commonly referred to as a gel layer), which is disposed over an array of electrodes. One such system is disclosed in U.S. Pat. No. 3,882,271 (Glenn). Such modulators include a metal reflective layer disposed on the surface of the gel which serves both as an electrode and as a light-reflecting medium.

SUMMARY OF THE INVENTION

The present invention is directed to a light valve or pixel structure for use in an electronic visual display. The structure includes a semiconductor substrate having an upper surface with reflective conductors formed thereon. The conductors function as electrodes and are arranged into groups, with each group including an actuation electrode and a grounding electrode. A layer of transparent material is disposed on the electrodes. The transparent material is deformable in response to an electric field generated by the electrodes, which occurs when a voltage is applied to the electrodes. When light is incident on the transparent material, the light transmits through the material, reflects off of the electrodes, and again traverses the material layer. When the electrodes are activated, deformation in the material layer functions as a wavelength diffraction grating which diffracts the reflected light. The light can then be directed to a lens for focusing on a projection screen for displaying an image.

In another preferred embodiment, the layer of deformable material is formed on a transparent electrode supported by a transparent substrate. The deformable material is spatially disposed in opposing relation to a reflecting electrode formed on a semiconductor substrate. When a voltage is applied to the reflecting electrode, an electric field is formed between the reflecting electrode and the transparent electrode which causes deformations in the deformable material layer. As a result, incident light is diffracted by the deformations in the material.

The present invention is also directed to a method of forming a light valve device for diffracting and reflecting incident light. The method involves the positioning of a substrate formed of semiconductor material and forming a reflective electrode on a surface of the substrate. The reflective electrode is capable of receiving voltages for generating an electric field. A layer of transparent dielectric material is then disposed on the electrode. The transparent dielectric material is capable of being deformed in response to the electric field so that when incident light is received by said substrate surface, the light will be diffracted by deformities in the layer and reflected by the electrode away from the surface.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference numerals denote similar elements throughout the several views:

FIG. 1A depicts a schematic perspective view of an electrode array;

FIG. 1B is a cross-sectional view of a pair of pixels constructed in accordance with a presently preferred embodiment of the invention;

FIG. 2A depicts a representation of a light path for a pixel in an "off" state;

DETAILED DESCRIPTION OF THE PRESENTLY PREFERRED EMBODIMENTS

Figure 2B:
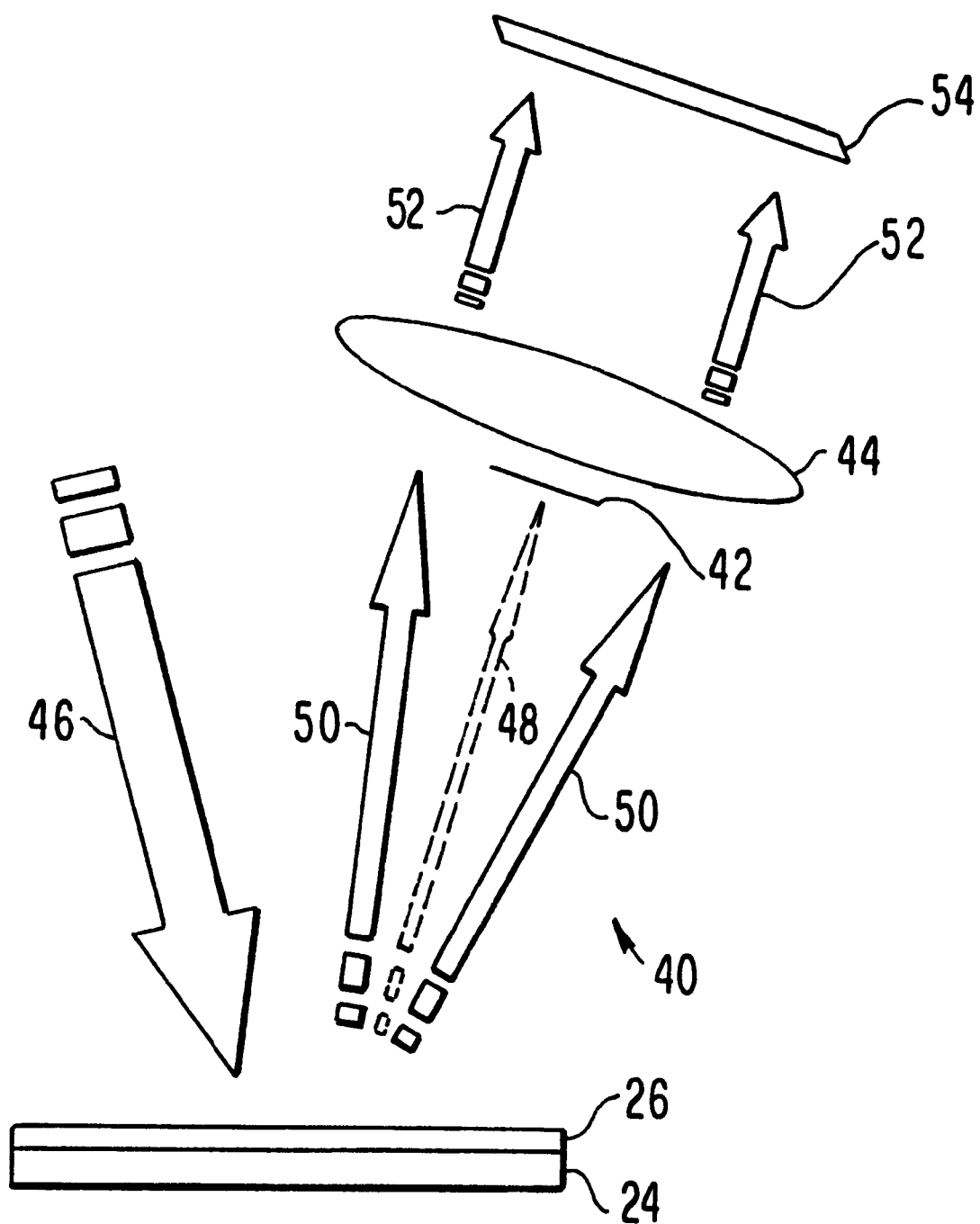
FIG. 2B depicts a representation of a light path for a pixel in an "on" state.

In FIGS. 1A and 1B, a light valve or pixel structure 10 in accordance with a preferred embodiment of the present invention is shown. The structure 10 is formed on a semiconductor substrate 12, such as silicon having an upper surface 14. A plurality of contact terminals or electrodes 16, 18, are formed on the upper surface 14 of substrate 12 in any known manner, such as by using standard CMOS techniques, e.g. chemical vapor deposition, deposition lithography, etc. The electrodes are constructed of a light-reflecting, electrically conducting material, such as aluminum. Although FIG. 1B depicts a cross-section of only two full pixel structures, it will be appreciated that the structures are produced in bulk on a common semiconductor substrate to form an array 24 as shown in FIG. 1A (which shows six pixel structures) which can be incorporated in displays for various uses including, televisions, computer monitors, mobile phones, computer games, wristwatches, etc.

The electrodes 16, 18 are disposed in parallel alternating relation to each other on substrate 12 and are designated as activation electrodes 16 and common or grounding electrodes 18. Electrical connection between the electrodes is realized by contact lines or leads 20, 22 so that the electrodes are connected in groups to form control terminals for the individual pixel elements. For example, a pixel n is shown in FIG. 1B having six electrodes, three of which are grounding electrodes which are connected to each other through leads 22, and the remaining three electrodes of the pixel are activation electrodes 16 which are connected to each other through lead 20n. As shown in FIG. 1B, the grounding electrodes from the pixel array 24 are connected to each other and, in operation, are connected to a common ground or zero voltage. A similar arrangement is illustrated for pixel n+1 in FIG. 1B. Each pixel will be separately activated by applying voltages to the respective activation electrodes or leads (e.g. lead 20n+1 for pixel n+1). It will be understood that although the electrodes are shown in the drawings as having an even number such that they are grouped in pairs for each pixel, this need not be the case. Any electrode arrangement can be employed without departing from the scope of the present invention. Moreover, it will also be understood that the number of electrodes shown for each pixel element (i.e. 6 electrodes) in FIG. 1B is arbitrary and the number can be increased or decreased depending on the particular pixel application or use.

With continued reference to FIG. 1B, the pixel structure 10 includes a layer of electrically deformable transparent material 26 having a surface 28 and disposed over the reflective electrodes 16, 18 on the substrate 12. Suitable transparent material 26 includes, for example, silicone gel, oil, various polymer materials or other viscous substances that have a tendency to deform when placed in the presence of an electric field. When the activation electrodes 16 of a particular pixel (n) are energized by applying a voltage thereto, an electric field between adjacent activation electrodes will form and cause surface 28 on the deformable transparent material 26 to contract or deform. At this point, the pixel is in an "on" state. When voltage is no longer applied, the surface 28 returns to a quiescent or "off" state (shown in pixel n+1). The surface deformities or ripples in material 26 function as a wavelength diffraction grating for diffracting incident light received by or directed at the valve 10.

As is known in general projection screen technology, the activation electrodes of each pixel in an array will receive an element of video information derived from a video signal. The element of video information is typically in the form of a stored charge which is applied to the pixel structures, e.g. the electrodes in the array 24. The application of the charge to the activation electrodes causes the deformable material layer 26 to deform in response to the level of charge applied.

FIGS. 2A and 2B illustrate the use of a single pixel structure in a projection system such as a Schlieren optical system which includes a beam stop 42 and an imaging lens 44. The imaging lens focuses light that avoids the beam stop 42 on a destination (e.g. a projection screen). In FIG. 2A, the pixel is depicted in its "off" or "black" state. Incident light 46 passes through the deformable material layer 26 in a first direction, reflects off of the reflective electrodes 16, 18 formed on substrate 24, and is directed back as reflected light 48 through layer 26 for receipt by the lens stop 42. Due to appropriate placement or location of lens stop 42, substantially all of the reflected light 48 is absorbed and does not reach lens 44 for imaging.

FIG. 2B illustrates the pixel structure in an "on" or "white" state. In this state, a voltage is applied to electrodes 16, 18 for causing deformation in transparent material layer 26. When in the "white" state, as incident light 46 is received and reflected by electrodes 16, 18, the deformations or ripples cause the outgoing or reflected light to diffract or spatially shift (as shown by arrows 50). Due to the shift, the diffracted light is no longer directed at lens stop 42 but passes to lens 44 for focusing (shown as arrows 52) on a projection screen 54. The use of the gel material layer 26 in the pixel structure 10 of the present invention allows nonpolarized light to be used to illuminate the electrodes 16, 18. Thus, the problem of inefficient light use present in prior liquid crystal projection display systems is avoided.

Figure 3:
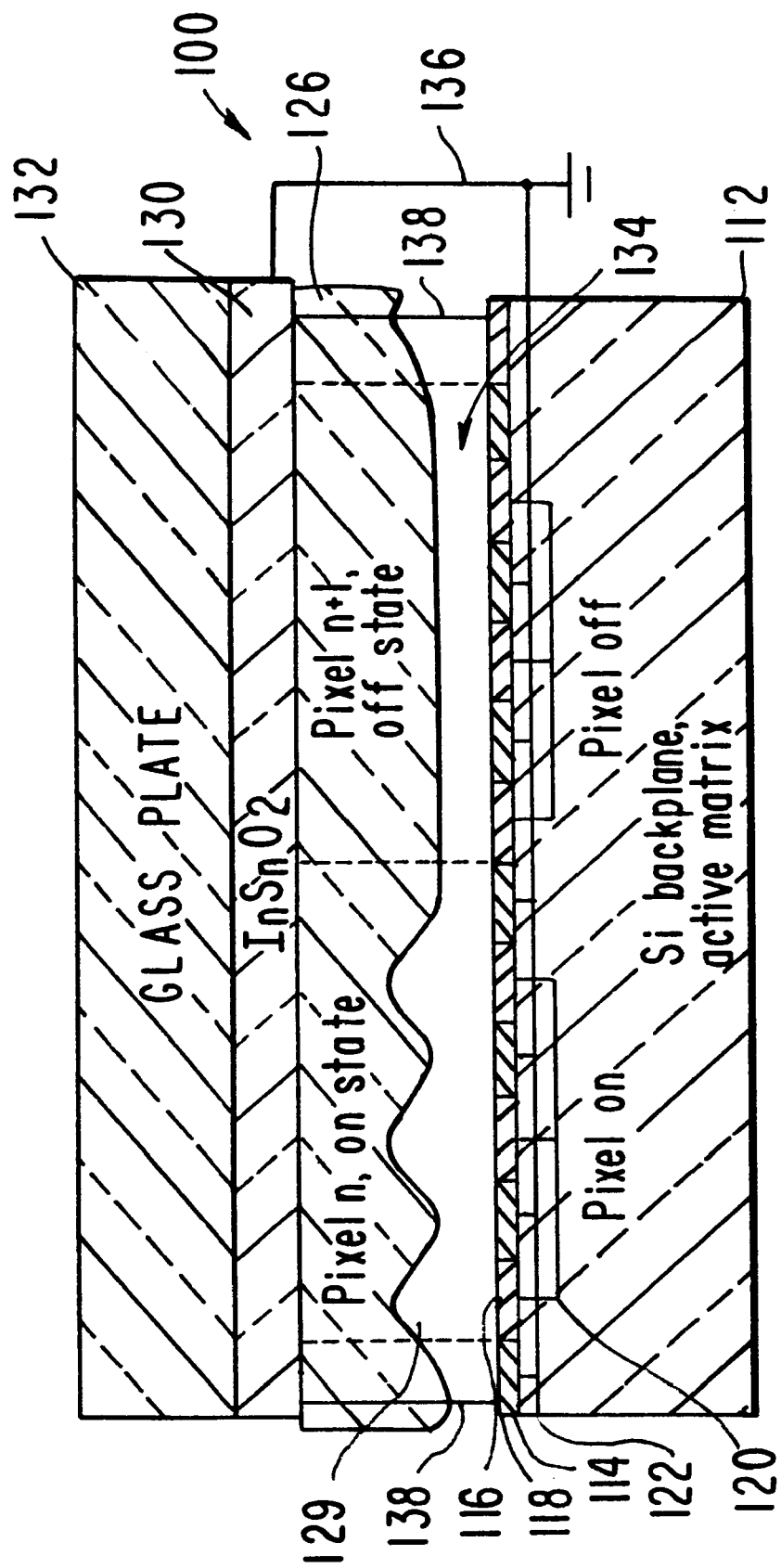
FIG. 3 is a cross-sectional view of a pair of pixels constructed in accordance with another embodiment of the present invention.

With reference now to FIG. 3, an alternative pixel structure 100 in accordance with the present invention is shown. This embodiment is similar to structure 10 in that it includes an array of active and grounding reflective electrodes 116, 118 formed on a semiconductor substrate 112. However, instead of material layer 126 formed directly on the substrate surface over the electrodes, the material layer is formed on a transparent electrode 130 which is disposed on and supported by a transparent substrate 132. The transparent electrode 130 is preferably made of indium tin oxide, as is known in the art, and the transparent substrate is a glass material.

As shown in FIG. 3, substrate 132 with material layer 126 disposed thereon is suspended above reflective electrodes 116, 118 by spacer elements 138 so that a deformation gap 134 is formed. Gap 134 can be air, gas or a vacuum, and provides a region for allowing deformation of material 126 without the material contacting the reflective electrodes. In operation, the transparent electrode 130 is maintained at the same voltage potential as the grounding electrodes 118, i.e. connected to ground. When an activation voltage is applied to the activation electrodes 116, such as to activate pixel n, an electric field is generated between the transparent electrode and the reflective electrodes which causes the formation of ripples in the material layer 126. This electric field passes through the entire material layer 126 and allows the material layer to be manipulated at reduced voltage values relative to the voltages required for operation of the pixel structure 10 in FIG. 1B. In other words, increased diffraction angles can be realized at lower voltages than those resulting from the structure 10 of FIG. 1B.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A dual state light valve device for diffracting and reflecting incident light, comprising:
   a substrate formed of semiconductor material;
   a reflective electrode formed on a surface of said substrate and capable of receiving voltages for generating a potential difference along a plane defined by said electrode for forming an electric field; and
   a layer of transparent dielectric material disposed on said electrode and capable of being deformed in response to the electric field so that when incident light is received by said substrate surface, the light will be diffracted by deformities in said layer and reflected by said electrode away from said surface.

2. The valve of claim 1, further comprising a modulated voltage source connected to the electrode, wherein an output voltage from the voltage source is modulated in response to a received video signal.

3. The valve of claim 1, wherein said substrate comprises silicon.

4. The valve of claim 1, wherein said electrode comprises a plurality of electrodes configured into an array of valves.

5. The valve of claim 4, wherein said array is a one-dimensional array.

6. The valve of claim 4, wherein said array is a two-dimensional array.

7. The valve of claim 1, wherein said valve is operable in an "on" state for diffracting and reflecting light, and in an "off" state for reflecting light without diffraction.

8. A light valve for use in a Schliering optic system having a focusing lens and a lens stop for focusing a diffracted optical signal and blocking a non-diffracted optical signal, comprising:
   a substrate formed of semiconductor material and having an upper surface;
   a reflective electrode formed on said substrate surface for receiving an applied voltage for generating a potential difference along a plane defined by said electrode; and
   a layer of transparent deformable material disposed on said reflective electrode, said material being manipulatable in response to the applied voltage for forming deformities in said layer so that incident light directed at said layer will undergo diffraction from said deformities and be reflected by said reflective electrode for receipt at the focusing lens.

9. The valve of claim 8, further comprising a modulated voltage source connected to the electrode, wherein an output voltage from the voltage source is modulated in response to a received video signal.

10. The valve of claim 8, wherein said substrate comprises silicon.

11. The valve of claim 8, wherein said electrode comprises a plurality of electrodes configured into an array of valves.

12. The valve of claim 8, wherein said deformable material comprises one of oil and silicone gel.

13. A light valve device for diffracting and reflecting incident light, comprising:

a substrate formed of semiconductor material:
a reflective electrode formed on a surface of said substrate and capable of receiving voltages;
a transparent substrate;
a transparent electrode formed on said transparent substrate; and
a layer of transparent dielectric material disposed on said transparent electrode and distally positioned in opposing spaced relation from said reflective electrode so that a gap is formed between said transparent dielectric material and said reflective electrode, said transparent and reflective electrodes forming an electric field through said transparent material when a potential difference is applied between said reflective electrode and said transparent electrode, said transparent material being capable of being deformed in response to the electric field so that when incident light is received by said valve, the light will be diffracted by deformities in said layer and reflected by said reflecting electrode.

14. The valve of claim 13, wherein said semiconductor substrate comprises silicon and said transparent substrate comprises glass.

15. The valve of claim 13, wherein said transparent electrode comprises indium-tin-oxide.

16. The valve of claim 13, further comprising spacers for maintaining spaced relation between said transparent material and said reflecting electrode.

17. The valve of claim 13, wherein said reflecting electrode is electrically connected to said transparent electrode.

18. The valve of claim 13, wherein said reflecting electrode comprises a plurality of actuating electrodes and a plurality of grounding electrodes arranged to form an array of valves, and wherein said grounding electrodes are electrically connected to each other and to said transparent electrode.

19. A method of forming a light valve device for diffracting and reflecting incident light, comprising the steps of:
   positioning a substrate formed of semiconductor material;
   forming a reflective electrode on a surface of said substrate, said reflective electrode being capable of receiving voltages for forming a potential difference along a plane defined by said substrate for generating an electric field; and
   disposing a layer of transparent dielectric material on said electrode, said transparent dielectric material being capable of being deformed in response to the electric field so that when incident light is received by said substrate surface, the light will be diffracted by deformities in said layer and reflected by said electrode away from said surface.

20. A method of forming a light valve device for diffracting and reflecting incident light, comprising the steps of:
   positioning a substrate formed of semiconductor material;
   forming a reflective electrode on a surface of said substrate, said reflective electrode being capable of receiving voltages;
   positioning a transparent substrate;
   forming a transparent electrode on said transparent substrate;
   disposing a layer of transparent dielectric material on said transparent electrode; and
   distally positioning said transparent electrode with said transparent dielectric material disposed thereon in opposing spaced relation from said reflective electrode so that a gap is formed between said transparent dielectric material and said reflective electrode for forming an electric field through said transparent material between said transparent and reflective electrodes when a potential difference is applied between said reflective electrode and said transparent electrode, said transparent material being capable of being deformed in response to the electric field so that when incident light is received by said valve, the light will be diffracted by deformities in said layer and reflected by said reflecting electrode.

* * * * *